United States Patent [19]

Jacobs et al.

[11] Patent Number: 4,942,745
[45] Date of Patent: Jul. 24, 1990

[54] LOCKING SECURITY ARRANGEMENT

[75] Inventors: Gregory A. Jacobs; Merrill G. Neal, both of Redondo Beach, Calif.

[73] Assignee: Yacht-Yok, A California Partnership, Hermosa Beach, Calif.

[21] Appl. No.: 381,592

[22] Filed: Jul. 18, 1989

[51] Int. Cl.$^5$ .............................................. E05B 73/00
[52] U.S. Cl. ........................................... 70/58; 70/258; 70/34
[58] Field of Search .................. 70/58, 14, 57, 32, 33, 70/34, 258, DIG. 79

[56] References Cited

U.S. PATENT DOCUMENTS

| | | | |
|---|---|---|---|
| 2,999,377 | 9/1961 | Raye | 70/32 |
| 4,081,979 | 4/1978 | Dawson | 70/58 |
| 4,171,851 | 10/1979 | Scruggs | 70/258 |

FOREIGN PATENT DOCUMENTS

234012  12/1944  Switzerland .............................. 70/58

*Primary Examiner*—Robert L. Wolfe
*Attorney, Agent, or Firm*—Scherlacher, Mok & Roth

[57] ABSTRACT

A locking security arrangement is provided for both mounting an electronic component on and locking the component to a bracket assembly. A threaded shaft removably mounted on a tumbler of a lock assesmbly by threaded engagement in an aperture is inserted through a non-circular aperture in the bracket assembly. The shaft is advanced into a threaded aperture in a housing of the electronic component until a non-circular portion of a housing of the lock assembly approaches and then enters the non-circular aperture. A key inserted in the tumbler permits continued rotation of the threaded shaft through rotation of the tumbler relative to the lock assembly housing in response to turning movement of key, to continue advancing the threaded shaft into the threaded aperture in the housing of the electronic component until the non-circular portion of the housing of the lock assembly is completely seated within the non-circular aperture. With the key then removed from the tumbler, unauthorized removal of the electronic component is prevented. However, authorized removal of the component is accomplished by inserting the key in the tumbler and rotating the tumbler in a direction to withdraw the threaded shaft from the threaded aperture in the component housing. The bracket assembly comprises a U-shaped bracket having opposite legs with offset portions having non-circular apertures therein for receiving the lock assemblies. Alternatively, a different hollow sleeve is disposed over each leg and has an offset portion with the non-circular aperture therein.

10 Claims, 3 Drawing Sheets

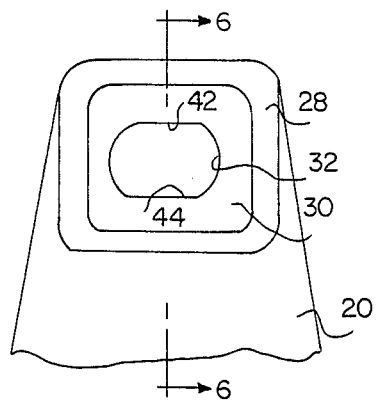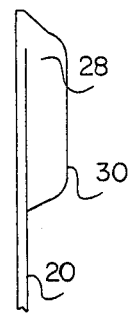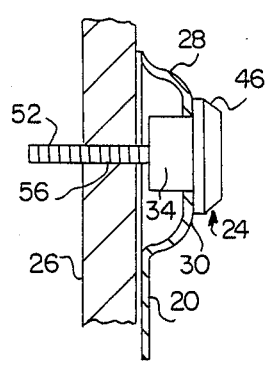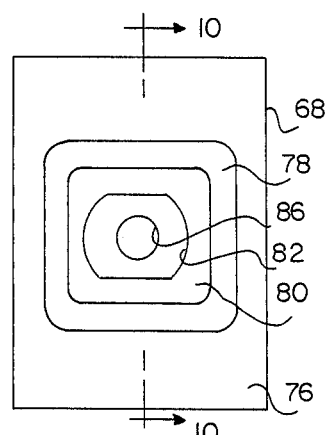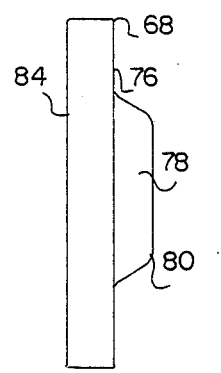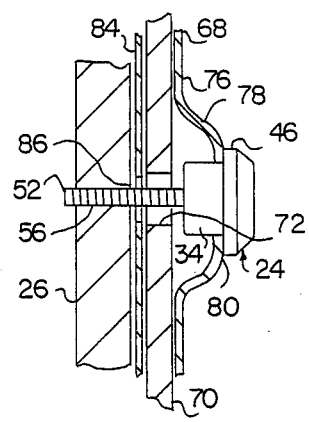

LOCKING SECURITY ARRANGEMENT

BACKGROUND OF THE INVENTION

1. Field of the Invention

The present invention relates to locking security arrangements, and more particularly to arrangements for lockably securing valuable items such as electronic equipment to a mounting bracket therefor.

2. History of the Prior Art

It is frequently necessary or desirable that pieces of equipment such as valuable electronic equipment be secured so as to prevent theft or other unauthorized removal thereof. At the same time, provision must be made for the authorized removal of such equipment to provide, for example, for servicing of the equipment.

Expensive marine electronic equipment is one example of equipment which is desirably secured by a lock. Boat break-ins and the accompanying thefts of such equipment suggests that such equipment be secured by locking whenever possible. At the same time, the equipment must be capable of authorized removal from the boat, such as for servicing.

Typically, marine electronic equipment is mounted within the boat's cabin using a bracket secured to a horizontal, vertical or overhead surface of the cabin and having an opposite pair of upstanding legs. The electronic component is releasably secured to the legs such as through use of wing screws inserted through apertures in the legs and then screwed into mating threaded apertures in the sides of the housing of the electronic component. The wing screws are easily removed to permit removal of the electronic component from the bracket mount therefor, such as for servicing or replacement of the component. However, a thief who breaks into the boat can just as easily remove the electronic component in order to steal it.

As a consequence various arrangements have been devised for securing valuable electronic components in a manner which locks the components to discourage or prevent theft while at the same time being receptive to a key or other coded device to permit authorized removal of the component. U.S. Pat. No. 3,370,446 of Francis describes an arrangement utilizing a key operated lock and a hollow locking member to secure an electronic component to the arm of a mounting bracket. Unfortunately, the key-operated lock only serves to secure the locking member to the bracket arm to prevent access to a separate thumb screw which is still required to secure the bracket arm to the electronic component. In U.S. Pat. No. 4,081,979 of Dawson a stud assembly is inserted through an aperture in a mounting bracket arm and into a mating threaded aperture in an electronic component to secure the component to the bracket arm. A separate collar surrounds the disk forming the head of the stud assembly, requiring use of a special tool member to remove the stud assembly from the electronic component. Arrangements requiring the use of such a tool member have proven to be of limited practicality in view of the expensive and cumbersome nature of such tool members when compared with the simplicity of devices such as an ordinary key. In U.S. Pat. No. 4,081,978 of Ivey an arrangement which includes a rod member and a lock functions to secure an electronic component. However, such arrangement serves only to lock the component, and separate apparatus is required for mounting the component. Other patents which are of interest but which do not describe arrangements providing practical or workable solutions to the problem of releasably securing items such as electronic components include U.S. Pat. No. 1,025,724 of Snyder, U.S. Pat. No. 3,771,338 of Raskin, U.S. Pat. No. 4,585,202 of Parsekian, U.S. Pat. No. 4,401,247 of Zoor and U.S. Pat. No. 4,656,848 of Rose.

SUMMARY OF THE INVENTION

Locking security arrangements in accordance with the invention provide relatively simple and economical arrangements for mounting a valuable item such as an electronic component to a bracket assembly for the component while simultaneously locking the component to the bracket assembly to prevent unauthorized removal of the component. At the same time, authorized removal is easily facilitated through use of an ordinary key which both unlocks the component and at the same time uncouples the electronic component from the bracket assembly.

In a preferred locking security arrangement according to the invention, a piece of equipment such as an electronic component is both mounted on and secured to a bracket assembly using a key-operated lock assembly. The bracket assembly has a non-circular aperture therein configured to non-rotatably receive a non-circular portion of a housing for the key-operated lock assembly. A flanged portion of the housing adjacent the non-circular portion serves to abut and limit travel of the key-operated lock assembly into the non-circular aperture when the noncircular portion of the housing is inserted in the noncircular aperture of the bracket assembly. The key-operated lock assembly includes a tumbler journaled for rotation within the housing and having a threaded shaft mounted thereon. However, rotation of the tumbler within the housing is possible only when a key is inserted in an outer end of the tumbler adjacent the flanged portion of the housing.

The piece of equipment is both mounted on and secured to the bracket assembly by inserting the key in the tumbler and rotating the tumbler in a given direction to advance the threaded shaft into a mating threaded aperture in the housing of the piece of equipment as the key-operated lock assembly is drawn through the non-circular aperture in the bracket assembly. As the tumbler is rotated by the key to advance the threaded shaft into the mating threaded aperture in the housing of the piece of equipment, the non-circular portion of the housing is drawn into the non-circular aperture of the bracket assembly until the flanged portion engages the bracket assembly.

The piece of equipment is thereby mounted on the bracket assembly, inasmuch as the key-operated lock assembly equipment. At the same time, the piece of equipment is locked to the bracket assembly upon removal of the key from the tumbler of the key-operated lock assembly. Without the key being inserted in the tumbler, the tumbler cannot be turned in an opposite direction to withdraw the threaded shaft from the mating threaded aperture in the housing of the piece of equipment.

When it is desired to remove the piece of equipment from the bracket assembly, the key is inserted in the tumbler and is rotated in a direction so as to withdraw the threaded shaft at the end of the tumbler from the mating threaded aperture in the housing of the piece of equipment. With the threaded shaft withdrawn from the mating threaded aperture in the housing of the piece of equipment, the key-operated lock assembly may then be completely removed from the non-circular aperture of the bracket assembly.

In a first embodiment of the bracket assembly, such assembly consists of a bracket of generally U-shaped configuration having a pair of opposite legs, with non-circular apertures therein. Each leg has a protruding portion which terminates in an outer surface offset from the leg and having the non-circular aperture therein. The protruding portion of each leg with its offset outer surface accommodates major portions of the housing and tumbler of one of a pair of key-operated lock assemblies therein, allowing the threaded shaft to extend into the mating threaded aperture in the housing of the piece of equipment.

In an alternative embodiment of the bracket assembly, such assembly includes a generally U-shaped bracket having a pair of opposite legs. Each of the opposite pair of legs has an aperture therein. The bracket assembly also includes a pair of hollow sleeves, each of which has a non-circular aperture therein and is configured to slip over a different one of the pair of apertured legs of the bracket. Each sleeve has an aperture in one side thereof which is aligned with the aperture of the leg and an opposite protruding portion terminating in an outer surface offset from the sleeve and having the non-circular aperture therein. The key-operated lock assembly is installed by inserting the threaded shaft of the tumbler through the noncircular aperture of the protruding portion of the sleeve, through the aperture in the leg, through the opposite aperture in the sleeve, and into the mating threaded aperture in the housing of the piece of equipment. As rotation of the key inserted in the tumbler advances the threaded shaft into the mating threaded aperture in the housing of the piece of equipment, major portions of the housing and the tumbler of the key-operated lock assembly are drawn through the non-circular aperture to the interior of the protruding portion of the sleeve adjacent the leg. Continued advancement of the threaded shaft into the mating threaded aperture eventually draws the flanged portion of the housing against the outer surface of the protruding portion of the sleeve with the non-circular portion of the housing non-rotatably disposed within the non-circular aperture.

The threaded shaft is coupled to the tumbler of the key-operated lock assembly via a threaded end thereof received within a mating threaded aperture in the tumbler. This permits threaded shafts of different diameter or thread configuration to be installed in the tumbler of the lock assembly. The different diameters or thread configurations enable the locking security arrangement to be used with different pieces of equipment having different threaded apertures in the housings thereof.

BRIEF DESCRIPTION OF THE DRAWINGS

A better understanding of the invention may be had by reference to the following description, taken in conjunction with the accompanying drawings, in which:

FIG. 4 is a front view of the bracket arm shown in FIG. 2;

FIG. 5 is a side view of the bracket arm shown in FIG. 2;

FIG. 6 is a sectional view of the bracket arm of FIG. 2 taken along the line 6—6 of FIG. 4 and illustrating the manner in which the key-operated lock assembly is received therein so that the threaded shaft thereof extends into the housing, of the piece of equipment;

FIG. 8 is a front view of the sleeve of the arrangement shown in FIG. 7;

FIG. 9 is a side view of the sleeve shown in the arrangement of FIG. 7; and

FIG. 10 is a sectional view of the sleeve of FIG. 7 taken along the line 10—10 of FIG. 8 and illustrating the manner in which the key-operated lock assembly is received therein with the threaded shaft thereof extending through the aperture in the leg and into the housing of the piece of equipment.

DETAILED DESCRIPTION OF THE INVENTION

Figure 1:
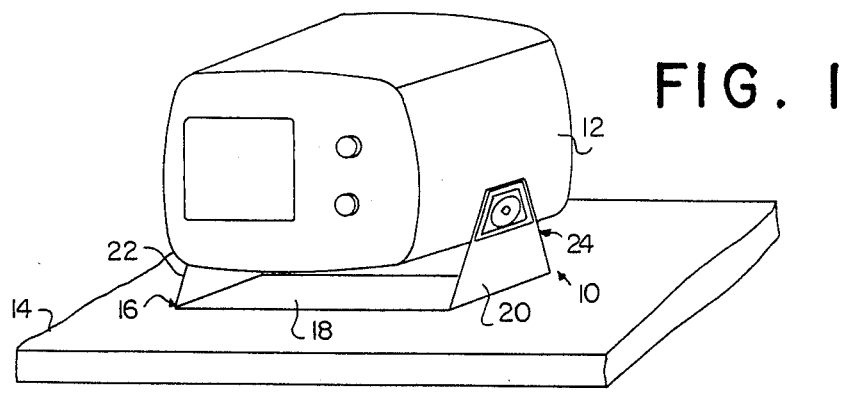
FIG. 1 is a perspective view of a locking security arrangement in accordance with the invention for securing a piece of equipment to a surface.

FIG. 1 depicts a locking security arrangement 10 in accordance with the invention for securing a piece of equipment 12 to a surface 14. The piece of equipment 12 can comprise any appropriate valuable item to be secured to the surface 14 such as a sonar or other expensive marine electronic component. The surface 14 is shown as being horizontal for purposes of illustration only, and it could be a vertical surface or a surface at other appropriate orientation. In the case of a marine electronic component to be secured, the surface 14 would typically comprise one of the working surfaces present in the boat's cabin.

The locking security arrangement 10 includes a bracket assembly 16, which in the example of FIG. 1 comprises a generally U-shaped bracket 18 having opposite upstanding legs 20 and 22. The bracket 18 is secured to the surface 14 by any appropriate arrangement such as high strength adhesive, screws or the like.

As described hereafter, the piece of equipment 12 is secured to the leg 20 of the bracket 18 by a key-operated lock assembly 24. The lock assembly 24 serves both to mount the piece of equipment 12 on the leg 20 and to secure the piece of equipment 12 against unauthorized removal. The opposite leg 22 of the bracket 18 is secured to an opposite side of the piece of equipment 12 by a lock assembly identical to the lock assembly 24. Accordingly, the leg 22 and the lock assembly associated therewith need not be described in detail, inasmuch as the leg 20 and the lock assembly 24 are described in detail herein.

Figure 2:
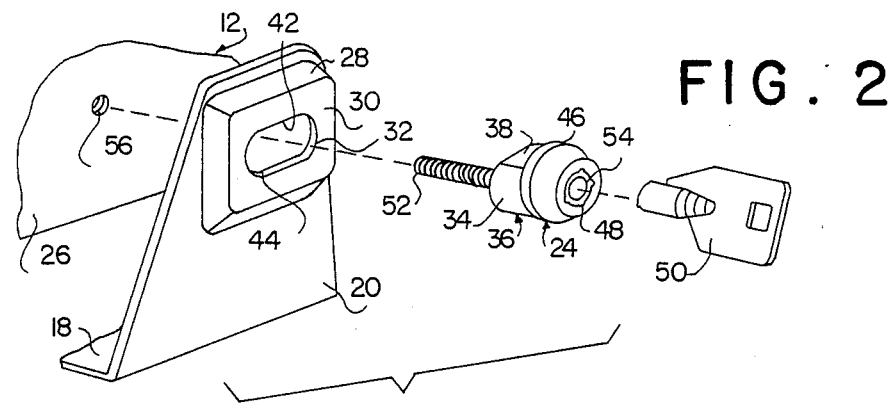
FIG. 2 is an exploded perspective view of a portion of the arrangement of FIG. 1 showing the manner in which a key-operated lock assembly extends through a non-circular aperture in the leg of a U-shaped bracket and into the housing of the piece of equipment.
Figure 3:
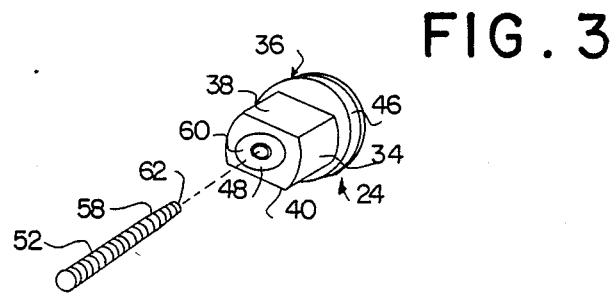
FIG. 3 is a perspective view of the key-operated lock assembly illustrating the manner in which a threaded shaft is mounted on the tumbler thereof.

FIG. 2 is an exploded perspective view of the leg 20 of the bracket 18 together with the lock assembly 24 and an adjacent portion of a housing 26 of the piece of equipment 12. The leg 20 has a protruding portion 28 at an upper end thereof which terminates in an outer surface 30 offset from the leg 20 and having a non-circular aperture 32 therein. The non-circular aperture 32 which is straight along top and bottom portions thereof and curved at opposite side portions thereof is configured to non-rotatably receive a non-circular portion 34 of a housing 36 of the lock assembly 24. The non-circular portion 34 of the housing 36 has opposite flat surfaces 38 and 40 (best shown in FIG. 3) which abut straight top and bottom portions 42 and 44 of the non-circular aperture 32 to prevent rotation of the housing 36 when installed within the non-circular aperture 32. A flanged portion 46 of the housing 36 adjacent the non-circular portion 34 abuts the outer surface 30 of the protruding portion 28 of the leg 20 in order to seat the housing 36 in a desired position within the non-circular aperture 32. This is shown in FIG. 6 which is described hereafter.

The housing 36 of the lock assembly 24 has a tumbler 48 journaled therein. The lock assembly 24 is essentially of conventional design, with the tumbler 48 being rotatable within the housing 36 only upon insertion of a key 50 within the tumbler 48. With the key 50 inserted in the tumbler 48, the key 50 may be rotated in either direction to rotate the tumbler 48 relative to the housing 36 of the lock assembly 24.

The lock assembly 24 includes a threaded shaft 52 mounted on and extending from the tumbler 48 opposite a front end 54 of the lock assembly 24. The threaded shaft 52 serves to couple the lock assembly 24 and thereby the leg 20 of the bracket 18 to the housing 26 of the piece of equipment 12. The housing 26 has a threaded aperture 56 therein to receive the threaded shaft 52. Initially, as the threaded shaft 52 is inserted through the non-circular aperture 32 and is started into the threaded aperture 56, the entire lock assembly 24 may be rotated so as to advance the threaded shaft 52 into the threaded aperture 56. As the non-circular portion 34 of the housing 36 approaches and then enters the non-circular aperture 32, the key 50 must be inserted in the tumbler 48 so that the tumbler 48 can be rotated relative to the housing 36 to continue advancing the threaded shaft 52 into the threaded aperture 56. The threaded shaft 52 is advanced into the threaded aperture 56 by a desired amount so that the flanged portion 46 of the housing 36 resides against the outer surface 30 of the leg 20 and the leg 20 resides against the housing 26 of the piece of equipment 12.

The threaded shaft 52 has a threaded end portion 58 thereof received within a mating threaded aperture 60 in the tumbler 48 to mount the threaded shaft 52 on the tumbler 48. The threaded shaft 52 also has a slot 62 in the threaded end portion 58. Should the threaded end portion 58 of the threaded shaft 52 loosen and then unscrew from the mating threaded aperture 60 in the tumbler 48 while attempting to remove the threaded shaft 52 from the threaded aperture 56 in the housing 26 of the piece of equipment 12, a screwdriver blade may be inserted in the slot 62 to assist in removing the threaded shaft 52 from the threaded aperture 56.

Because the piece of equipment 12 may come with threaded apertures 56 of varying sizes or thread configurations, the removable feature of the threaded shaft 52 permits installation on the tumbler of a threaded shaft 52 having a diameter and thread configuration which will mate with the threaded aperture 56. Thus, the lock assembly 24 may be provided with a variety of different threaded shafts 52 of different sizes and thread configurations, each having a threaded end portion 58 of standard size for receipt within the threaded aperture 60 to mount the threaded shaft 52 on the tumbler 48.

FIGS. 4 and 5 are respectively front and side views of the leg 20 showing the details of the protruding portion 28 thereof. FIG. 6 is a sectional view of the leg 20 taken along the line 6—6 of FIG. 4, together with the lock assembly 24 and a portion of the housing 26 of the piece of equipment 12. As shown in FIG. 6, when the lock assembly 24 is in the installed position, the flanged portion 46 of the housing 36 abuts the outer surface 30 of the protruding portion 28 of the leg 20. The non-circular portion 34 of the housing 36 resides within the non-circular aperture 32 in non-rotatable fashion. The thickness of the protruding portion 28 accommodates a major portion of the non-circular portion 34 and the tumbler 48 therein, allowing the threaded shaft 52 to extend from the end of the tumbler 48 into the threaded aperture 56 in the housing 26 of the piece of equipment 12.

It was previously noted that the tumbler 48 of the lock assembly 24 is rotatable within the housing 36 only with the key 50 inserted in the tumbler 48. With the key 50 inserted in the tumbler 48, the key 50 may be rotated in one direction in order to advance the threaded shaft 52 into the threaded aperture 56 until the housing 36 is seated within the non-circular aperture 32 and the leg 20 resides against the housing 26 of the piece of equipment 12, as shown in FIG. 6. With the key 50 then removed from the tumbler 48, the tumbler 48 cannot be rotated within the housing 36, and this prevents unauthorized removal of the threaded shaft 52 from the threaded aperture 56 to remove the piece of equipment 12 from the bracket 18.

Authorized removal of the piece of equipment 12 from the bracket 18 is accomplished by inserting the key 50 into the tumbler 48 and then rotating the key 50 and thereby the tumbler 48 in a direction to withdraw the threaded shaft 52 from the threaded aperture 56. When the threaded shaft 52 is completely removed from the threaded aperture 56 so that the lock assembly 24 can be withdrawn from the non-circular aperture 32 in the leg 20 the piece of equipment 12 is then free of the leg 20. As previously noted, the opposite leg 22 is coupled to the opposite side of the piece of equipment 12 in like fashion using a lock assembly like the assembly 24. A similar process is performed to separate the piece of equipment 12 from the leg 22. The piece of equipment 12 is then completely free of and may be removed from the bracket 18.

As previously noted the lock assembly 24 is essentially of conventional design except for the presence of the removable threaded shaft 52. An example of a lock which may be used with slight modifications is sold as Model No. TS1038U Short by Fort Lock Company of Chicago, Ill.

Figure 7:
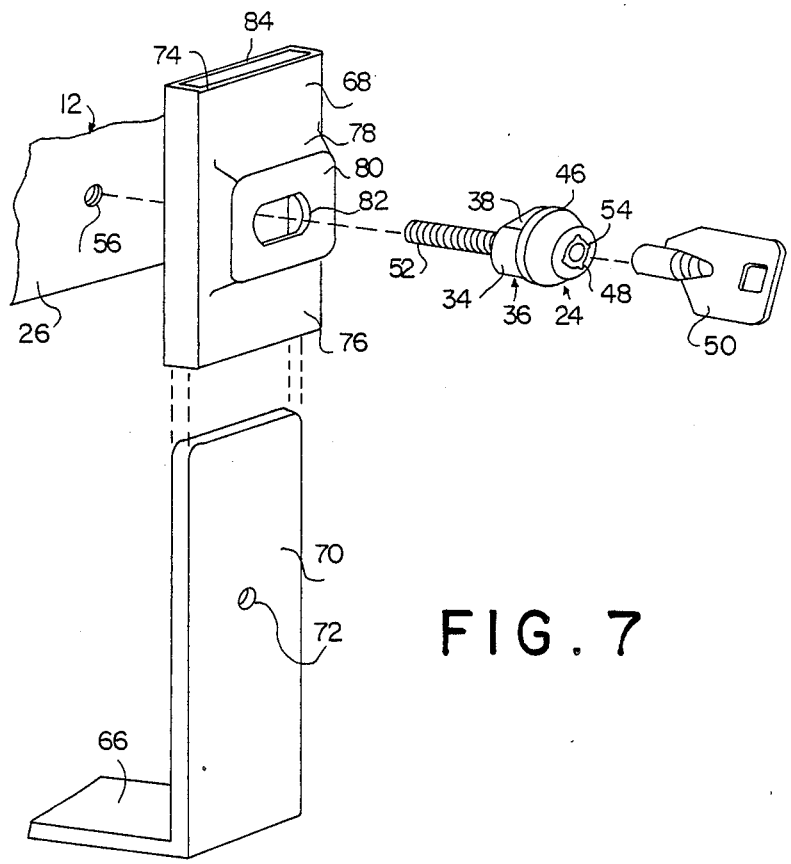
FIG. 7 is an exploded perspective view of a portion of an arrangement similar to that of FIG. 1 but illustrating an alternative embodiment in which the bracket assembly is comprised of a U-shaped bracket having an apertured arm and a hollow sleeve adapted to receive the arm therein and having a non-circular aperture therein.

In the locking security arrangement 10 thus far described, the bracket assembly 16 consists of the U-shaped bracket 18 having the opposite legs 20 and 22. The leg 20 is configured as shown in FIGS. 2 and 4–6, and the leg 22 is configured similarly. In an alternative embodiment which is shown in FIGS. 7–10, the bracket assembly 16 is comprised of a generally U-shaped bracket 66 and a pair of hollow sleeves. The bracket 66 is essentially the same size as the bracket 18 of FIGS. 1–6 and has opposite upstanding legs. However, the legs are elongated and of generally uniform width and thickness, with one of the legs 70 being shown in FIGS. 7 and 10. As shown in FIG. 7, the leg 70 has an aperture 72 therein. The opposite leg is of like configuration.

The pair of hollow sleeves 68 are of like configuration. One of the hollow sleeves 68 which is associated with the leg 70 and which is shown in FIGS. 7-10 is of elongated, generally rectangular configuration and has a hollow interior 74 therein dimensioned to receive the leg 70. The sleeve 68 has a front 76 thereof which has a protruding portion 78 terminating in an outer surface 80 offset from the front 76 and having a non-circular aperture 82 therein. The non-circular aperture 82 is like the non-circular aperture 32 of the leg 20 of FIG. 2 in that it is configured to non-rotatably receive the non-circular portion 34 of the housing 36 of the lock assembly 24. The hollow sleeve 68 has a back 84 opposite the front 76 having an aperture 86 therein opposite the non-circular aperture 82. The presence of the back 84 allows the sleeve 68 to encircle the associated leg 70 when placed thereover, helping to position and secure the sleeve 68 on the leg 70. However, the back 84 may be eliminated where desired, so that the sleeve 68 consists only of the front 76 and the opposite sides extending therefrom.

Unlike the U-shaped bracket 18 of FIGS. 1-6 which has the legs 20 and 22 thereof specially configured to receive the lock assembly 24, the U-shaped bracket 66 of FIGS. 7-10 may be of conventional design with the piece of equipment 12 normally being mounted thereon using wing screws or similar devices extending through the aperture 72 of the leg 70 and into the threaded aperture 56 in the housing 26 of the piece of equipment 12 with the opposite leg of the U-shaped bracket 66 being secured to the piece of equipment 12 in like fashion. In accordance with the invention, however, the lock assembly 24 is employed in conjunction with the hollow sleeve 68 to secure the leg 70 to the piece of equipment 12. The opposite leg of the U-shaped bracket 66 is secured to the opposite side of the piece of equipment 12 in like fashion. The hollow sleeve 68 is positioned over the leg 70 so that the non-circular aperture 82 and the opposite aperture 86 thereof generally align with the aperture 72 in the leg 70. The threaded shaft 52 of the lock assembly 24 is then inserted through the non-circular aperture 82, through the aperture 72 in the leg 70, through the aperture 86 in the back 84 of the sleeve 68, and then into the threaded aperture 56 in the housing 26 of the piece of equipment 12. The lock assembly 24 is then rotated to advance the threaded shaft 52 into the threaded aperture 56 until the non-circular portion 34 of the housing 36 approaches and then enters the non-circular aperture 82 in the front 76 of the sleeve 68. At that point the key 50 must be inserted in the tumbler 48 in order to rotate the tumbler 48 in a direction which continues to advance the threaded shaft 52 into the threaded aperture 56.

FIGS. 8 and 9 are respectively front and side views of the hollow sleeve 68. FIG. 10 is a sectional view of the sleeve 68 taken along the line 10—10 of FIG. 8, together with the lock assembly 24, the leg 70 and a portion of the housing 26 of the piece of equipment 12. The lock assembly 24 is shown in the installed position in FIG. 10. The protruding portion 78 of the sleeve 68 accommodates the major portion of the non-circular portion 34 of the housing 36 and the tumbler 48. The threaded shaft 52 extends through the aperture 72 in the leg 70, through the aperture 86 in the back 84 of the sleeve 68, and into the threaded aperture 56 in the housing 26 of the piece of equipment 12.

Thus, the hollow sleeve 68 functions in conjunction with the leg 70 in much the same manner as the protruding portion 28 of the leg 20 functions in the example of FIGS. 1-6. The opposite leg of the U-shaped bracket 66 is secured to the opposite side of the housing 26 of the piece of equipment 12 through use of a hollow sleeve and lock assembly of like configuration to that shown and described in FIGS. 7-10.

While the invention has been particularly shown and described with reference to preferred embodiments thereof, it will be understood by those skilled in the art that various changes in form and details may be made therein without departing from the spirit and scope of the invention.

What is claimed is:

1. An arrangement for securing a piece of equipment to a securing surface comprising the combination of:
   a securing surface;
   a piece of equipment having a housing;
   a bracket assembly mounted on the securing surface; and
   a key-operated lock assembly non-rotatably mounted within the bracket assembly and having a shaft disposed within a mating aperture in the housing of the piece of equipment, the shaft of the lock assembly being capable of removal from the housing of the piece of equipment only with the use of a key.

2. The invention set forth in claim 1, wherein the lock assembly includes a housing non-rotatably mounted within the bracket assembly and a tumbler mounted within the housing of the lock assembly and being rotatable relative thereto only with insertion of a key therein.

3. The invention set forth in claim 2, wherein the shaft is a threaded shaft, the mating aperture in the housing of the piece of equipment is a threaded aperture and the tumbler includes the threaded shaft which is disposed within the mating threaded aperture in the housing of the piece of equipment to secure the piece of equipment to the lock assembly and to the bracket assembly.

4. The invention set forth in claim 2, wherein the housing of the lock assembly has a non-circular portion thereof and the bracket assembly has a non-circular aperture therein configured to and non-rotatably receiving the non-circular portion of the housing of the lock assembly therein.

5. The invention set forth in claim 2, wherein the bracket assembly includes a leg having an aperture therein and a hollow sleeve disposed over the leg and having an aperture therein, the sleeve non-rotatably receiving the housing of the lock assembly in the aperture therein and the lock assembly extending through the aperture in the leg and the shaft thereof extending into the mating aperture in the housing of the piece of equipment.

6. The invention set forth in claim 5, wherein the housing of the lock assembly has a non-circular portion thereof and the one of the opposite apertures in the sleeve is non-circular and conforms to and non-rotatably receives the non-circular portion of the housing of the lock assembly therein.

7. A locking security arrangement comprising the combination of a bracket assembly having a first non-circular aperture therein, a first lock having a housing and a tumbler journaled within the housing and rotatable relative to the housing only with use of a key, the housing having a non-circular portion thereof which is non-rotatably receivable within the first non-circular aperture in the bracket assembly, the tumbler having a shaft mounted thereon for securing engagement with a device to be secured to the bracket assembly, the bracket assembly comprising a bracket of generally U-shaped configuration having a pair of opposite legs, one of which has the first non-circular aperture therein and the other of which has a second non-circular aperture therein of configuration like the first noncircular aperture, and a second lock of configuration like the first lock non-rotatably received within the second non-circular aperture.

8. The invention set forth in claim 7, wherein each of the pair of legs has a protruding portion terminating in an outer surface offset from the leg and having one of the non-circular apertures therein.

9. A locking security arrangement comprising the combination of a bracket assembly having a first non-circular aperture therein, a first lock having a housing and a tumbler journaled within the housing and rotatable relative to the housing only with use of a key, the housing having a non-circular portion thereof which is non-rotatably receivable within the first non-circular aperture in the bracket assembly, the tumbler having a shaft mounted thereon for securing engagement with a device to be secured to the bracket assembly, the bracket assembly including a bracket of generally U-shaped configuration having a pair of opposite legs, a first hollow sleeve configured to receive one of the opposite legs therein and having the first noncircular aperture therein and a second hollow sleeve configured to receive the other one of the opposite legs therein and having a configuration like the first hollow sleeve and a second noncircular aperture therein, and a second lock of configuration like the first lock non-rotatably received within the second non-circular aperture of the second hollow sleeve.

10. The invention set forth in claim 9, wherein each of the first and second hollow sleeves has a protruding portion terminating in an outer surface offset from the sleeve and having the first or the second non-circular aperture therein, an associated one of the pair of opposite legs has an aperture therein for receiving the shaft when the first or the second lock is mounted within the non-circular aperture, and the hollow sleeve has an aperture therein opposite the protruding portion for receiving the shaft when the associated one of the pair of opposite legs is received within the sleeve and the first or the second lock is mounted within the non-circular aperture in the offset outer surface of the protruding portion of the hollow sleeve.

* * * * *